June 3, 1930.   C. STEDEFELD   1,762,085
APPARATUS FOR JOINTLESSLY WELDING RAILS
Filed Feb. 8, 1928   9 Sheets-Sheet 1

June 3, 1930. C. STEDEFELD 1,762,085
APPARATUS FOR JOINTLESSLY WELDING RAILS
Filed Feb. 8, 1928 9 Sheets-Sheet 2
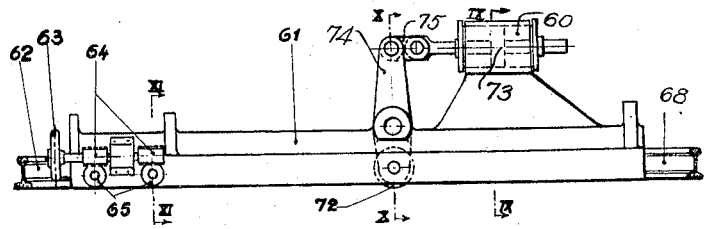
Fig. 7
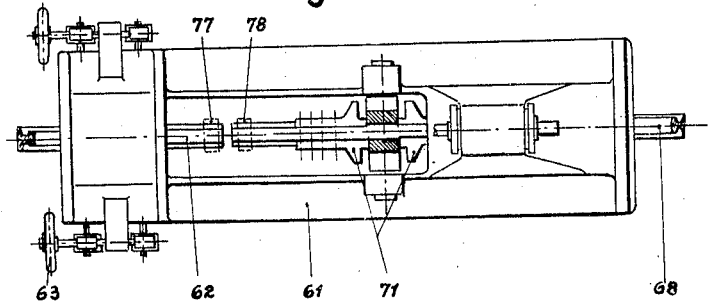
Fig. 8
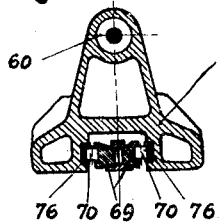
Fig. 9 (IX-IX)
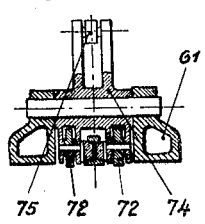
Fig. 10 (X-X)
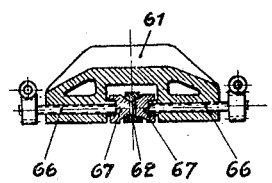
Fig. 11 (XI-XI)
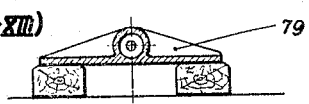
Fig. 13 (XIII-XIII)
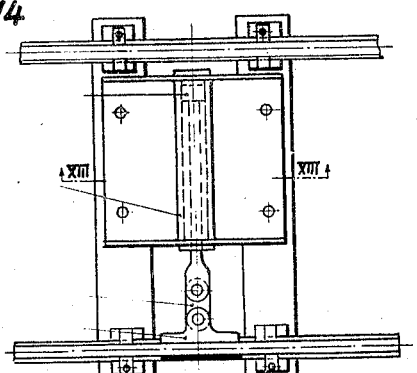
Fig. 14
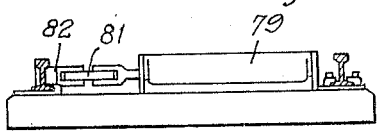
Fig. 12

June 3, 1930.  C. STEDEFELD  1,762,085
APPARATUS FOR JOINTLESSLY WELDING RAILS
Filed Feb. 8, 1928  9 Sheets-Sheet 3
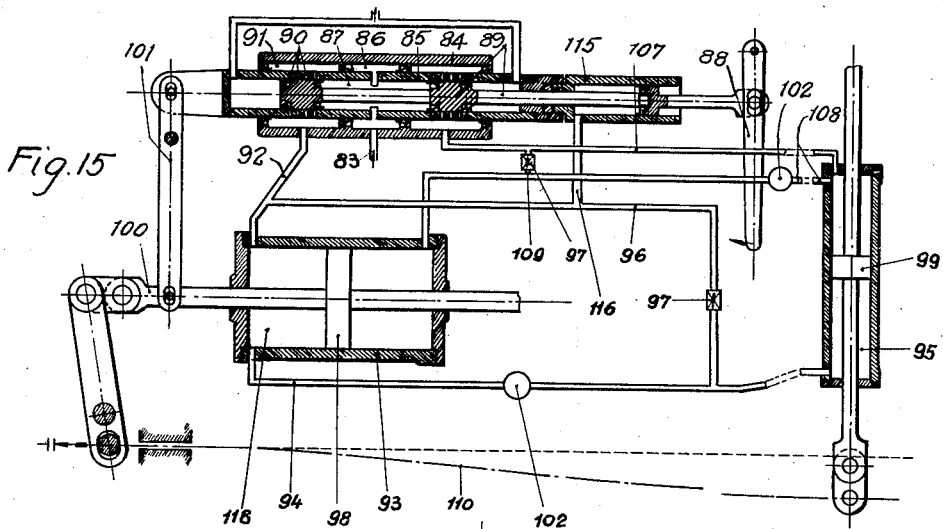
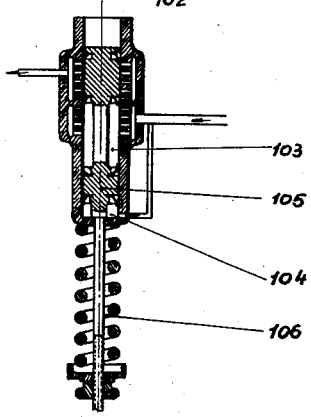
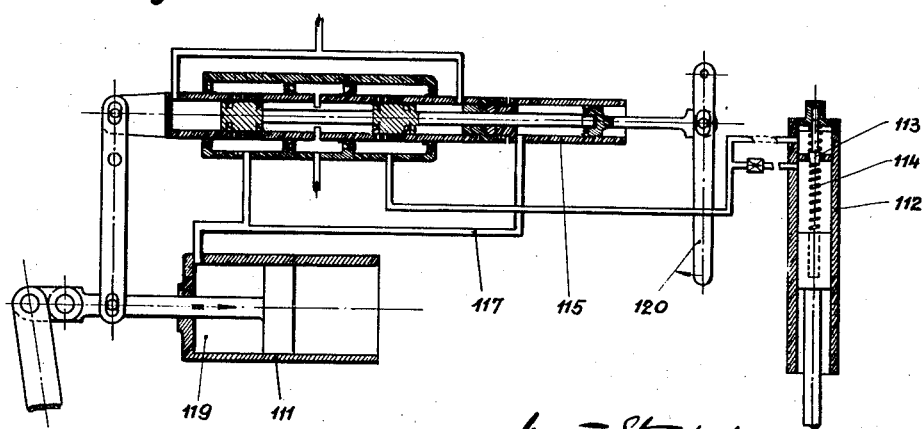

June 3, 1930.   C. STEDEFELD   1,762,085
APPARATUS FOR JOINTLESSLY WELDING RAILS
Filed Feb. 8, 1928   9 Sheets-Sheet 4
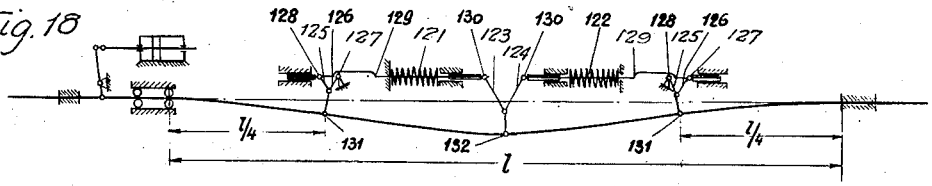
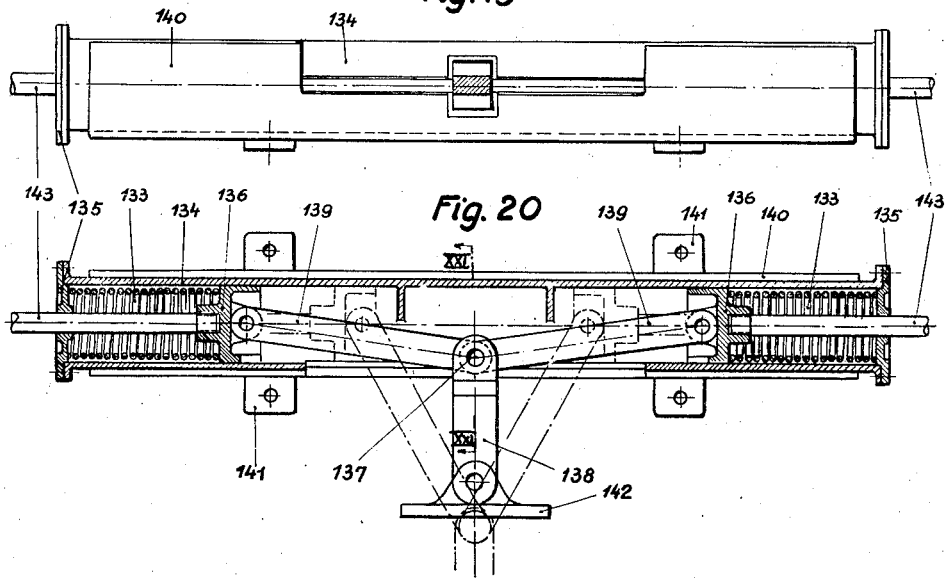
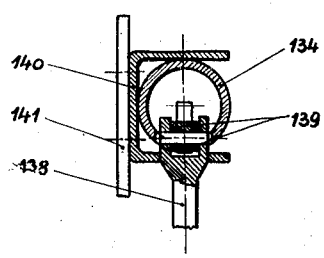
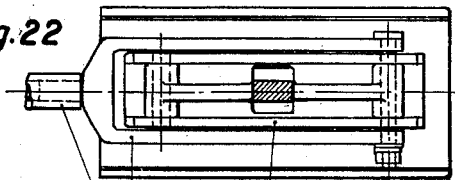
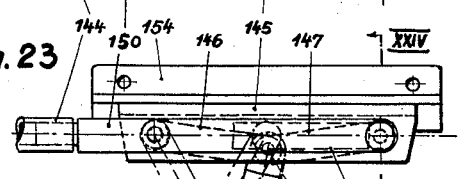
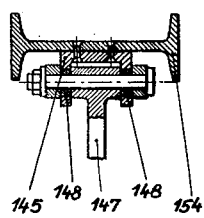

June 3, 1930.  C. STEDEFELD  1,762,085
APPARATUS FOR JOINTLESSLY WELDING RAILS
Filed Feb. 8, 1928  9 Sheets-Sheet 5
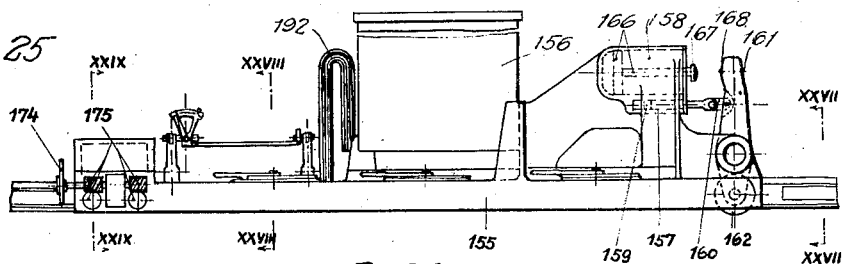
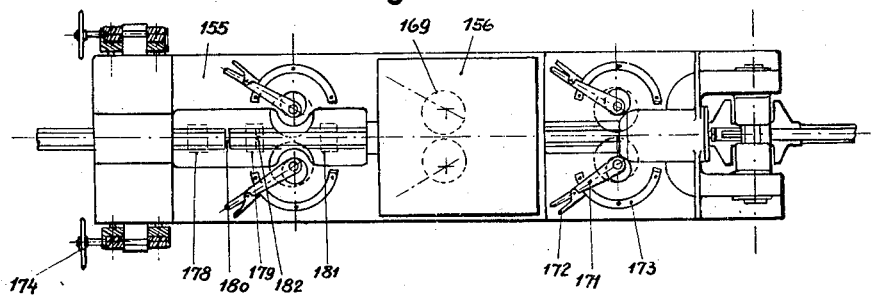
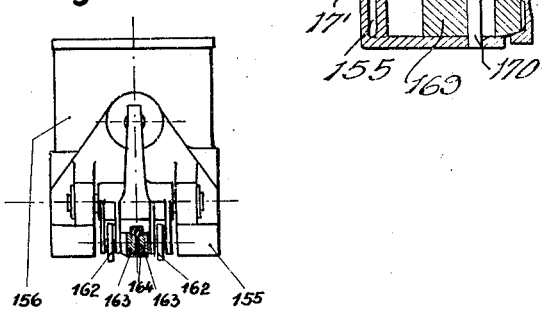
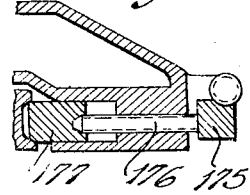
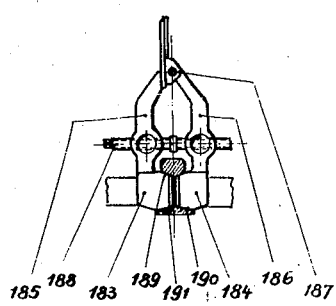
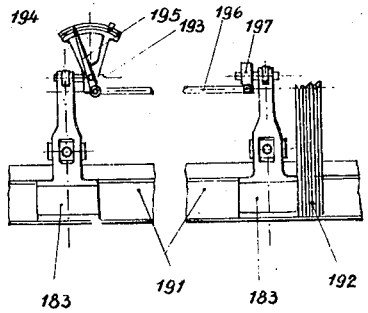

June 3, 1930.　　　　　C. STEDEFELD　　　　　1,762,085
APPARATUS FOR JOINTLESSLY WELDING RAILS
Filed Feb. 8, 1928　　　9 Sheets-Sheet 6

June 3, 1930.   C. STEDEFELD   1,762,085
APPARATUS FOR JOINTLESSLY WELDING RAILS
Filed Feb. 8, 1928   9 Sheets-Sheet 7

June 3, 1930.                    C. STEDEFELD                    1,762,085
                    APPARATUS FOR JOINTLESSLY WELDING RAILS
                            Filed Feb. 8, 1928          9 Sheets-Sheet 9
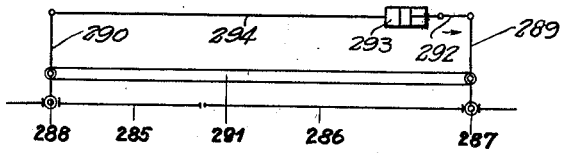
Fig. 37
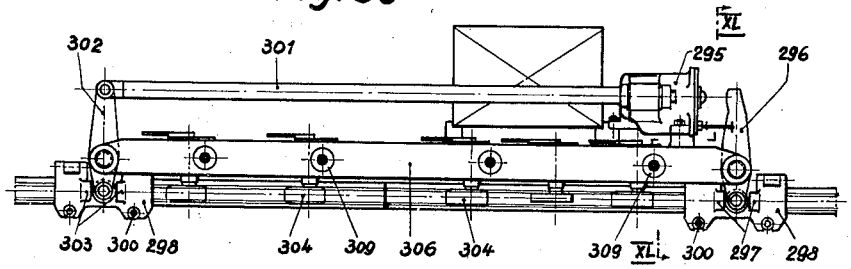
Fig. 38
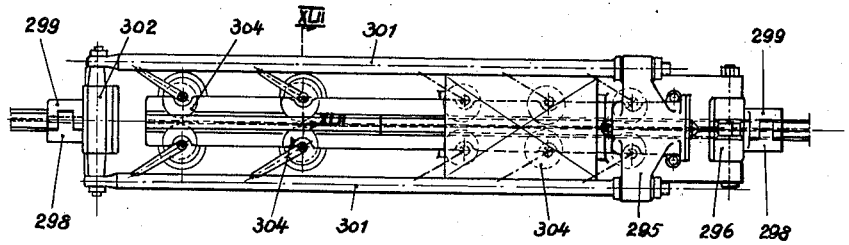
Fig. 39
Fig. 40 (XL-XL)     Fig. 41 (IXL-IXL)     Fig. 42 (XLII-XLII)
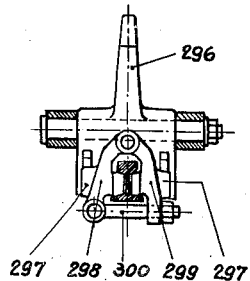   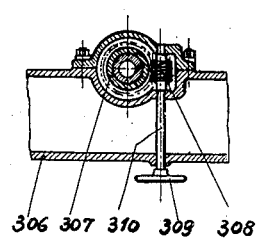   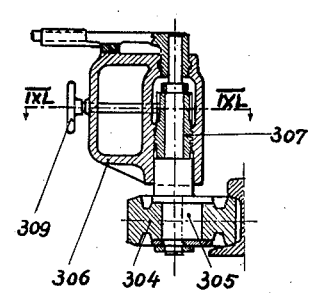
Fig. 43              Fig. 44              Fig. 45
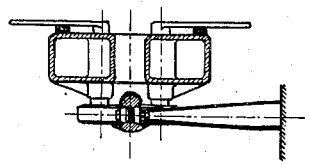   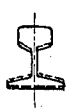   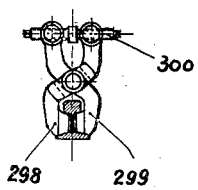

Patented June 3, 1930

1,762,085

UNITED STATES PATENT OFFICE

CURT STEDEFELD, OF HEIDELBERG, GERMANY

APPARATUS FOR JOINTLESSLY WELDING RAILS

Application filed February 8, 1928, Serial No. 252,932, and in Germany December 27, 1926.

Not only in tramway tracks in cities, but also in overland and long distance railway tracks the fish plate joints with gaps to compensate for the expansion caused by changes in temperature between the joining ends of the rails have been recently replaced by jointless welded joints. Generally the expansion gaps are still provided at greater distances from one another, but it can be expected, considering the present state of the art, that railway tracks having all joints welded, without any expansion gaps, may be constructed with all reliability of service. In railway tracks, where expansion gaps separate greater lengths of rails from one another, these greater lengths can be welded together in the work-shops, transported to the line and there mounted. If these lengths should become very great, or if the expansion gaps shall be totally omitted, this method cannot further be employed and a great number or all of the joints must be welded out of the work-shop on the line. This involves a number of new problems, the solutions of which are given by the present invention.

As a first example the welding of the last joint between the rails of a track which has been erected from two end points, will be considered, or the repairing or renewal of a defective place in a completely welded railway track.

In well suited methods of welding rail-joints, for instance in the alumino-thermal (thermit) butt welding and the electric butt welding and particularly in the melting-off welding method the rail ends must be moved against each other, respectively, alternately against and away from one another. This is possible with comparatively simple means on welded rails, having expansion gaps at not too great distances from one another. The problem is different, when the expansion gaps lie far apart, or when no such gaps are provided. In the first case a very great length of the track must be dismounted, and furthermore it is not easy to move this length in the manner required for welding, for instance with the melting-off method. In the second case the possibility of movement disappears entirely with the omission of the expansion gaps.

Referring to the drawings:

Fig. 7 is a side elevation of hydraulic means for moving and/or bending the rails;

Fig. 8 is a plan view thereof;

Fig. 9 is a cross-section on line IX—IX of Fig. 7;

Fig. 10 is a cross-section on line X—X of Fig. 7;

Fig. 11 is a cross-section on line XI—XI of Fig. 7;

Fig. 12 is a side elevation of means for bending the rails;

Fig. 13 is a cross-section thereof on line XIII—XIII of Fig. 14;

Fig. 14 is a plan of this bending device;

Fig. 15 shows in section one control means and conduits and cylinders whereby a longitudinal and bending movement is imparted to a dismounted rail section;

Fig. 16 is a sectional view of the slide valve designated by numeral 102 in Fig. 15;

Fig. 17 is a view similar to Fig. 15, showing a slightly modified form;

Fig. 18 shows diagrammatically an arrangement whereby spring pressures are used for bending the rail;

Fig. 19 is a side elevation, and

Fig. 20 is a plan view, parts of which are in cross-section of one form of spring and joint connection as used in the general arrangement shown in Fig. 18;

Fig. 21 is a cross-section on line XXI—XXI of Fig. 20;

Fig. 22 is a side elevation of one system of connecting links of Fig. 18; and

Fig. 23 is a plan thereof;

Fig. 24 is a section on line XXIV—XXIV of Fig. 23;

Fig. 25 shows a front view of one form of welding apparatus; and

Fig. 26 is a plan view thereof;

Fig. 27 is a section on line XXVII—XXVII of Fig. 25;

Fig. 28 is a section on line XXVIII—XXVIII of Fig. 25;

Fig. 29 is a section on line XXIX—XXIX of Fig. 25;

Fig. 30 shows a detail of the length-measuring device, and

Fig. 31 is a side elevation thereof;

Fig. 37 shows diagrammatically an arrangement, wherein the welding frame and parts carried thereby are above the rails to allow the joint to be visible;

Fig. 38 shows a side elevation of a frame constructed as indicated in Fig. 37; and Fig. 39 is a plan thereof;

Fig. 40 is a section on line XL—XL of Fig. 38;

Fig. 41 is a section on line XLI—XLI of Fig. 42;

Fig. 42 is a section on line XLII—XLII of Fig. 39;

Fig. 43 shows a section of a rail for suspension railways with the clamping rollers between the supporting brackets;

Fig. 44 shows two rails to be welded in which there is a difference in height between the two fish plate chambers; and Fig. 45 shows a detail in section somewhat similar to Fig. 40.

Figure 1:
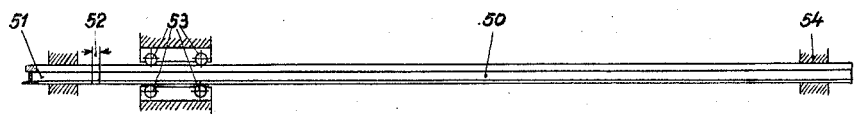
Fig. 1 is a side elevation.
Figure 2:
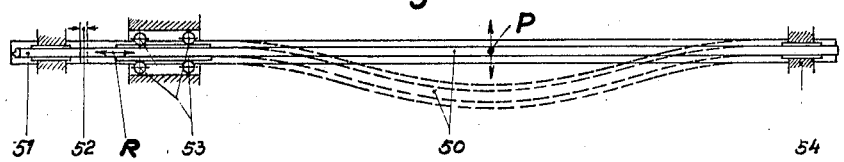
Fig. 2 is a plan of one form of the invention.

The fundamental idea of the method according to this invention is shown in Figs. 1 and 2. The previously described longitudinal movements are replaced by bending the end of one rail (50) crosswise against the end of the other rail at the joint, whilst the end of the other rail (51) is held firmly in the clamping device. By means of computation a certain length of the rail is predetermined which is dismounted from the sleepers in one direction from the place of repairing. About in the middle of the dismounted stretch a force P is provided, which is adapted to bend the rail (50) in the plane of the least moment of resistance at the right angle to its length so far until the required gap (52) at the joint to be welded is attained. It is necessary that the rail (50) can be moved lengthwise easily and positively without tilting, preferably by guiding it by means of the indicated rollers (53), and that the opposite end (54) of the dismounted stretch is securely held. For the generation of the jumping pressure required in a welding connection and for the purpose of giving assistance to the force P, a force R is brought into action lengthwise of the rail at a short distance from the joint to be welded.

Figure 3:
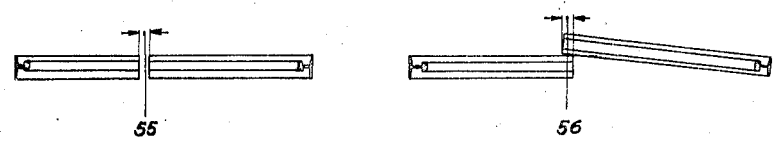
Fig. 3 is a detail showing a gap between rails.
Figure 4:
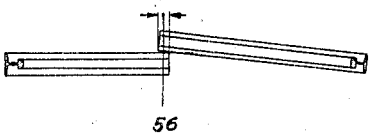
Fig. 4 is another detail showing an overlap of rails.
Figure 5:
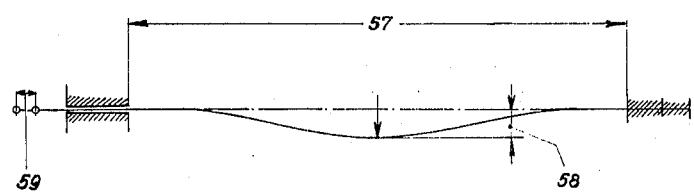
Fig. 5 is a diagrammatic view similar to Fig. 2.

Another supposition for this method is, that there is no gap at the point of welding (55) Fig. 3, but that there is a suitable overlapping (56) Fig. 4 to compensate the shortening of the rail at the welding point. In the case, that a break occurs during summer at a temperature above normal, this condition is fulfilled by the expansion, caused in the rail itself. According to the temperature prevailing in winter a greater or lesser gap may arise at the point of breakage, which must be closed up, before welding can be begun. The simplest manner in which this may be done, is to warm up a stretch of the rail on one or on both sides adjacent to the part, which is to be repaired with a set of heating flames or with electricity to such an extent, that the abutting parts of the joint will overlap (56) instead of having a gap (55) between them.

A computation shows, that the required force of movement and the strain arising when the rail is bent, are within absolutely acceptable limits, so that repair welding on the line can be done quickly and with comparatively simple means. With the rail profiles commonly used a length (57) of about 21–27 meters must be dismounted and bent out to the distance of 40–64 cms. (58) in order to obtain a burning-off and jumping length (59) of 2–4 cms., whereby the elastic limit of the rail material of about 3000 kgs./cm.$^2$ is not passed in bending. The force at the point of bending will thereby be about 500 kgs. and is therefore increased by the forces of friction easily obtainable by means of either mechanical or hydraulic devices.

The jumping pressure required, according to which method is adopted, lies between 100 and 300 kgs./cm.$^2$ of the welding sectional area, and amounts therefore in a sectional area of 60 cm.$^2$ to the maximum of 18000 kgs.

Assuming to have an hydraulic device of 50 atmospheres liquid pressure, the result will be with the transmission in proportion of 1:1 a cylinder diameter of about only 210 mm.

Figure 6:
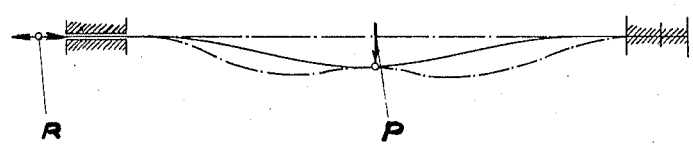
Fig. 6 is another diagrammatic view.

The moving devices may be actuated mechanically, electromechanically or hydraulically. A condition for satisfactory operation is, that the movement of the end of the rail, i. e. the motive forces P and R can be controlled from a place in the immediate neighbourhood of the joint which is to be welded, so that these forces, according to the arrangement desired, will act singly or jointly and that they are timed compulsorily in relation to one another in such a manner, that the bending line of the dismounted part of the rail is always in all its conditions of movement a simple one without intermediate bends (Fig. 6), which would increase the strain on the rail material beyond its capacity.

When welding smaller cross sectional areas the movements may be carried out manually, preferably by providing an intermediate second transmission, so as to attain the required jumping pressure, whereas for larger sectional areas, aside from electromechanical, hydraulic devices because of their simple means in attaining high powers are preferable.

In order to explain this method more fully two modified examples of such devices, which are actuated hydraulically, now are described.

In the first example both forces of movement (longitudinal force R and bending force P) are generated by hydraulic pressure.

The entire device including the pressure cylinder (60) for the generation of the longitudinal force as well as the moving parts belonging thereto are mounted on an iron frame (61). The rail end (62) which is held firmly located is clamped to the iron frame (61) by means of handwheels (63), worm gearing (64, 65), threaded spindles (66) and clamping jaws (67). These clamping jaws (67) are inserted lengthwise, after the frame has been placed over the rail and simultaneously they act as vertical guides for the rail. (Fig. 11). The guiding plates (69) are provided with hardened surfaces for the guiding rollers (70) Fig. 9, and also with lugs (71). The rollers (72) press against these lugs and transmit the movement of the pressure piston (73) to the rail (68) by means of the lever (74) and the connecting link (75). The rollers (70), which are guided in a cage, are inserted after the frame has been placed over the rail. They are provided for the horizontal and vertical guidance of the rail (68). So as to provide for adjustment one of the hardened running surface plates (76) is provided with a wedge shaped surface, and arranged longitudinally adjustable in the frame (61). For electrical welding copper jaws may be provided for current conduction at the points indicated by (77) and (78). By means of an insulating layer, preferably between the clamping jaws (67) and the rail (62) the rail ends can be insulated electrically from one another.

The device for bending the rail is very simple. Referring to Figs. 12, 13 and 14, the hydraulic cylinder (79) is placed onto and bolted against two sleepers of the dismounted rail stretch. The movements of the piston (80) are transmitted to the rail by means of the connecting link (81) and the forked member (82). It is advisable to provide one or more supports below the rail, because it is moved beyond the sleeper ends at the point of its biggest deflection. The comparatively small amount of counter force against the piston is transmitted to the opposite rail line by the sleepers and there is compensated.

The steering apparatus and the course of the liquid for this arrangement is shown diagrammatically in two fundamental modifications in the Figs. 15—17. In both cases the liquid flow of both cylinders is regulated by one steering valve, which is actuated manually and arranged in such a manner, that every position of the moved rail is determined to a certain position of the hand lever. The moving operations of the first modification according to Fig. 15 are as follows: The pressure liquid coming from the conduit pipe (83) passes through the chamber (86) which is formed by the slide valve chest (84) and the steering shell (85) and from there into the chamber (87). When the hand lever (88) and therewith the steering piston (89) is moved in the direction indicated by the arrow, the pressure liquid enters the chamber (91) through the openings (90), which has opened. From here it flows through the conduit pipe (92) to the cylinder (93) and further to the conduit pipe (94) and the cylinder (95). The conduit pipe (96) is closed in this direction by means of the check non-return valve (97). The pistons (98) and (99) now move in the direction indicated by the pivoted arrow, until the return lever (101), which is moved by the piston rod (100) has conveyed the steering shell (85) after the steering piston (89) so far, that the flowing openings (90) are closed.

During movements, which follow rapidly one after another, the tandem arrangement of the cylinders will counteract in itself any intermediate bendings of the rail, as the crosswise cylinder will be favoured with pressure liquid, when the rail is bent, and the lengthwise cylinder when the rail is straightened.

In order to prevent any possible intermediate bending, particularly at the start of the rail movement, throttled slide valves (102) are provided in conduits (94) and (108). One of such valves is shown in section in Fig. 16. Liquid from pipe (94) passes into cylinder (103) to thereby act upon the connected pistons (105) and (105'). A pipe of smaller diameter than pipe (94) also allows the fluid under pressure to flow into cylinder (104) to thereby act upon the opposite face of piston (105). Pressure is thus gradually built up in cylinder (104) to raise pistons (105) and (105') against the tension of the adjustable spring (106), thus exposing openings in cylinder (103) whereby the liquid may pass through to the other connection of pipe (94).

In order to return the rail to its normal position, the hand lever 88 is moved to the right. Liquid under pressure then may pass into conduit 107, since plunger 89 exposes the proper openings in chamber 84. This liquid enters cylinder 95 above piston 99 to force the same downwardly to thus bend the rail back to normal. Liquid also passes through conduit 108 to cylinder 93 to the right of piston 98. Pressure is relieved from the opposite sides of pistons 99 and 98 by the one-way valves 97.

For clearness the rail is indicated by dotted lines (110).

According to Fig. 17 in the modified second example the steering slider and the arrangement of the levers is the same as in the example above described. The arrangement is simplified inasmuch as the cylinders are single acting. The piston (111) actuates the forward movement, that is the jumping of the rail and the cylinder (112) actuates the bending movement. The return flow of the liquid out of the cylinders may be directed or effected in the manner indicated, e. g. by the cylinder (112) through an adjustable high pressure valve (113). By such a valve it is attained, that the rail is always kept under bending tension, and intermediate bendings are positively avoided. In order to avoid an excessive expense of power in the active cylinder and when the movements are nearly finished, the valves are to be preferably discharged over a spring (114) by the pistons more and more, and finally raised up. The influx of the liquid to the cylinders is not disturbed by this arrangement.

By means of particular cylinders (115), which are arranged, for instance around the steering slider, and which are connected with the insides (118) and (119) of the cylinders by means of the pipes (116) and (117) and which therefore are held under the same pressure conditions an effective feeling of the jumping pressure is transmitted to the operator at the hand lever (88) and (120).

In the second example diagrammatically illustrated in Fig. 18 the longitudinal movement of the rail again is actuated by means of a pressure liquid. Consequently the device for clamping and guiding the ends of the rails in connection with hydraulic cylinder and moving mechanism is also the same, as has been previously described.

The steering slider may also be the same as in Figs. 15 and 17 with the limitation of the conduit to only one double acting cylinder (93).

The bending of the rail in this example is done mechanically by spring motive power which is not immediately controlled. The arrangment provides two springs (121, 122) whose motive power acts on the rail by means of the link-arms (123, 124). The system of joints is designed in such a manner, that the bending force grows steadily with the increase of the deflection. In order to avoid absolutely intermediate bendings, which for instance may arise, when one spring is seized or a jamming in the guides occurs or something similar happens, the rail is compulsorily moved at numerous points in such a manner, that the most favourable bending line is obtained in all positions. In the present case, there are, besides the system of links in the middle of the dismounted rail stretch, also two more systems of links each distanced 1/4 from the place where the rail is clamped. The link arms (125) and (126) are half as long as the link arms (123) and (124). The link points (127) are firmly located whereas the link points (128) are connected with the link points (130) by means of the rods (129). Thereby it is attained, that at the points (131) the rail shows always half of its maximum bending in the middle (132) of the section, the elastic line being therefore always the most favourable with regard to the stress.

For example it is possible to construct the spring and joint arrangement as indicated in the Figs. 19–24. The springs (133) which correspond to springs (121) and (122) of Fig. 18 are encased in a cylinder (134) and supported at one end by the cylinder cover (135) and at the other end by the piston (136). To this piston the arms (139) and the lever (138) are linked by means of bolts (Fig. 21) at the point (137). The cylinder (134) is provided with suitable cut-outs for the movements of the link arms. For durability the cylinder is disposed in a wrought iron case (140), which can be fastened to the sleepers by means of plates (141) in a similar way as the hydraulic cylinder described in Fig. 14. The connection with the rail is attained by means of the connecting member (142) corresponding to point (132) of Fig. 18. The connection of the other systems of links at points (131), Fig. 18, with the rod (143) is effected by means of the intermediate pipe (144). This system of links is illustrated in Figs. 22, 23 and 24. The main body is an U-shaped wrought iron member (145) on which the jointed lever (146) is pivotally mounted, whilst the other jointed lever (147) is arranged with a movable joint so, that it can be pushed lengthwise by means of the sliding members (148) in the slot (149). The forked lever (150) which corresponds to link (129) of Fig. 18 connects the jointed lever (147) and the pipe (144). At the point (151) the link arms (146) and (147) again are bolted to the lever (152) and connected with the rail by means of the connecting member (153) which corresponds to point (131). The wrought iron member (145) may for instance be riveted to a T-beam (154) and bolted to the sleeper in a well known manner.

The present invention gives solutions for a number of other problems, particularly for electric butt welding and melting-off welding methods. At present the welding devices constructed for work-shops are very heavy and hard to handle and therefore cannot be used on the line. The invention however shows new arrangements of devices, which are best suited for the use on the line.

The real welding process itself, will always be done quickly, when positive welding is done.

Much more time is required for the preparation of welding, i. e. the straightening of the rail ends, the applying and fastening of the welding devices and so on.

The welding arrangements must possess the following characteristic features: They must warrant like the known stationary welding machines secure and faultless welding and must allow a very simple manipulation, they must be so designed, that they can be transported easily from one place to another and must be brought in short time to a good working order not only for mounting new tracks, but also for repairing old ones.

A welding arrangement designed according to these requirements is shown in Figs. 25–31.

The device consists substantially of the frame (155 arranged symmetrically to the rail, suporting the guiding and moving apparatus and the transformer (156).

In the machine described in the first part of this specification a hydraulic cylinder is provided for moving the rail lengthwise and for jumping the rail ends to be welded together. In connection with the electric melting-off welding method, which is likely to be used by preference the procedure is as follows:

After the current has been switched for the rail ends to be welded they are brought into contact so that the points of contact get strongly heated. When one of the ends is quickly moved from and to the other end of the rails, which shall be welded, the contacting surfaces which are very small in the first moment of the procedure are melted-off, so that larger surfaces come into contact. Finally the whole sectional area has attained the same welding heat. In this moment the rail ends thus prepared are jumped together with but one blow.

The moving of one of the rails requires comparatively little power, but necessitates a quick succession of movements. The jumping requires only in one direction a blow-like acting strong force. If in an hydraulic arrangement only one cylinder is used and which then must be sufficiently large because of the strong power necessary for the jumping, the quantities of water for carrying out the movements of the movable rail end are so large, that an accurate adjustment is very difficult. Therefore two pressure cylinders (157) and (158) are provided. The piston (159) of the smaller cylinder (157) is double acting and connected to a lever by a link shackle (160), this lever transmitting the movements of the piston to the rail (164) by rollers (162) and plates (163). The piston (165) of the larger cylinder (158) is a one-sided pressure-piston. The piston rod (166) provided with a bearing disk (167) touches the correspondingly designed portion (168) of the lever (161).

The large piston remains at first in its neutral position, as indicated in the figure. Only after the rail faces which shall be welded together have become welding hot, the large cylinder is supplied with hydraulic pressure, whereby the blow-like jumping together is effected. The diagram showing the conduct of liquid and the steering mechanism is described hereinafter by an example.

Guiding the movable rail end is effected by rollers (169), which engage the web in the manner shown in Fig. 28 and guide the rail horizontally as well as vertically. The rollers are located on eccentric bolts (170) and are pressed against the rails by hand levers (171). These levers are retained in their position by locking levers (172) which engage finely serrated steel segments (173). The eccentricity of the bolts (170) is such that the rollers turned back can pass freely aside of the rail head. Owing to the separate adjustment of the rollers a secure contact of all these with the rail is warranted.

Clamping fast the stationary rail end is effected by means of the handwheels (174) with thread wheels (175), spindles (176) and clamping jaws (177).

Conducting the current must be done in such a way that an equal intensity of current is reached in all parts of the sectional area. A particularly good distribution of the current at the head and at the foot of the rail through large and good contacting conduction surfaces is attained according to this invention by causing the current conducting cheeks to engage the rails in the fish-plate chambers. There at the top and the bottom exist two oblique and narrow limited faces which effect very high contact pressure with only small acting power. By this reason there are in the present invention the current contact cheeks arranged completely separate from the clamping jaws of the holding and moving appliances and contrarily to the qualified compromise solutions shown till now, every sort of cheeks can be attached at that place of the rail, which is most suited for that purpose. In fact, if necessary the clamping fastenings can be located close to the welding point and also the moving appliances can be located at said place, whereas the supply of the current takes place more far away from the same. Thus, in Fig. 26 the current is supplied at the places (178) and (179) and the welding effected at the place (180) or the current is supplied at the places (178) and (181) and the welding is effected at the place (182).

Two constructional forms are shown by example in Fig. 30 and Fig. 31, of which the first shows the respective device in frontal view and the other in side view. The real copper cheeks (183) and (184) are hinged to one another at (187) by the bows (185) and (186) which are either cast into the cheeks or secured by screws to them, and are pressed against and withdrawn from the oblique faces (189) and (190) of the rail (191) by means of the spindle (188) having a right-handed thread and a left-handed one. The said cheeks are located at the movable end of the rail, and the current is supplied to them by means of sets of pliable copper bows (192) Fig. 25, which are particularly soft in the direction of rail motion. The cheeks, located at the stationary end of the rail can also be connected to the fundamental frame by means of sets of pliable copper bows.

When mounting new tracks the ends to be welded will be heated until the appropriate temperature has been attained, whereafter the respective faces are jumped together. How much of the material is burned away during the heating is of no consequence, but matters are different in the case of reparation where rail pieces are to be inserted into a welded endless line of rails. If the biggest tensional stresses produced by the lowest air temperature shall only arise to the same amount as the biggest compression stresses produced by the highest temperature, the inserted rail piece must have accurately the length of the removed piece, corrected with consideration to the temperature at which the repair is effected. The piece to be inserted receives to the length actually required an additional length certainly sufficient for the burning off and the jumping. This additional piece must anyhow be burnt off, even if the welding temperature should have been reached earlier than the additional length has completely burned off.

The Figs. 30 and 31 show a measuring device by means of which the operator can see at once how much there must be burned off and jumped. Graduated scales already are known with resistance welding machines but they are located between the mechanic clamping apparatus of the movable welding end and the fundamental body of the device and therefore give a wrong indication reaching the amount of the deformation of the fundamental frame and of the rarely avoidable small slips of the two welding pieces of the clamping members. In order to avoid completely these wrong indications, the measuring device is attached, according to this invention, to the jointbolt (193) of the bows (185) and (186), by which the current-supply cheeks (183) and (184) are pressed against the rail. Said device consists of a graduated scale (194), a pointer (195), a connecting rod (196) and an abutment (197). Before welding begins, i. e. before the electric current is switched for the cheeks, the rail ends are moved towards one another until they touch each other, and thereupon the adjustable sliding member is shoved forward by as much as the rail is too long. If necessary, two such sliding members can be provided, one for determining the melting-off limit, the other for determining the jumping limit. By providing a large ratio in the lever transmission, very small limits can be obtained.

In the first part of this specification the last and most difficult welding operation has been thoroughly described, viz, that welding operation, in which none of the two railends can be moved freely and the movability at the joint must be effected by the bending off of a dismounted portion of the rail. The insertion of a piece of rail generally will require two welding operations, of which the first can be effected without said bending-off. It is, therefore necessary, that the device can be quickly used for both cases in question. With the second example described in the first part of this specification, in which a mechanical bending-off device is used, this latter can be detached, if necessary, but if the device is designed for hydraulic operation with mutual dependency of the transverse power cylinder and of the longitudinal power cylinder it is necessary to provide means for connecting the liquid pipes solely with the latter cylinder.

Figure 32:
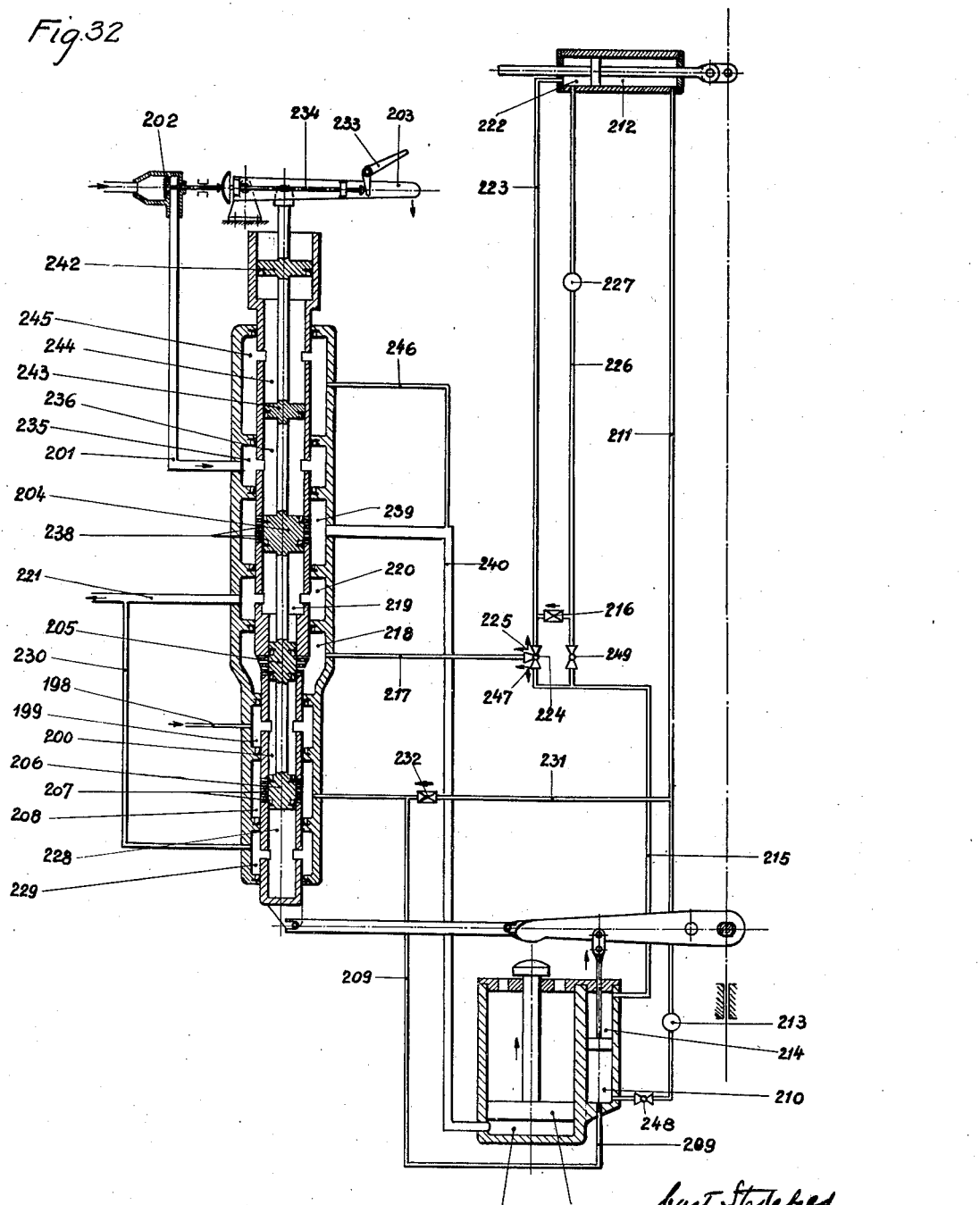
Fig. 32 is a diagram of further conduit connections for use in rail movements, wherein combined bending and longitudinal movements may be obtained, or longitudinal movement only.

In Fig. 32 a diagram of the conduct of the liquid is shown by example, this arrangement being designed for the use of two longitudinal power cylinders and one transverse cylinder. The controlling actions are practically the same as in the case described in the first part of this specification. The control slide valve is also in this instance operated manually and also provided with a return appliance, so that to every position of the hand-lever corresponds quite a distinct position of the moved rail. The conduct of the liquid for the longitudinal and the transverse power cylinder is the following. Through the pipe (198) pressure liquid enters the chambers (199) and (200). The supply pipe (201) for the pressure liquid is kept closed during the melting-off operation by the stop valve (202). When the lever (203) and with it the control pistons (204, 205, 206) are moved in the direction indicated by the arrow, the pressure liquid flows through slide-valve apertures (207) to the chamber (208) whence it passes through the pipe (209) to the piston side (210) and further by the pipe (211) to the piston side (212). In the pipe (211) a throttle slide-valve (213) is provided, (see Fig. 16), in order to obviate any intermediate bending-off of the rail. The return-flow from the piston side (214) takes place through the pipe (215) the check non-return valve (216), the pipe (217) the chambers (218, 219, 220) and the outlet pipe (221). From the piston side (222) the liquid flows through the pipe (223) and then further on the same way as just described. The position of the three way cock (224) is now that indicated by the arrow (225).

When the hand-lever (203) is moved contrarily to the direction indicated by the arrow the pressure liquid flows through the chamber (218) and the pipes (217 and (223) to the piston side (222), and further through the pipes (226) and (215) and the throttle slide valve (227) to the piston side (214). The return flow from the piston side (210) proceeds through the pipe 209, the chambers (208) and (228) and (229) and the outlet pipe (230); and from the piston side (212) through the pipes (211) and (231) the check non-return valve (232) and further as above described. When the melting-off has been finished, the valve (202) is opened by the bell-crank lever (233) and the pressure rod (234). The chambers (235) and (236) are thus filled with pressure liquid. When the lever (203) is moved in the direction indicated by the arrow, there is now, besides the piston sides (210) and (212) also filled with pressure liquid the cylinder (237) through the slide valve slots (238), the chamber (239) and the large pipe (240) and the required jumping pressure is produced by the piston (241).

In order to give to the operator a certain manual estimation of the jumping pressure a separate piston (242) is provided, which has a larger pressing surface, than the equalization piston (243). The chamber (244) is connected with the pipe (246) by the chamber (245) and the pipe (240) and is, therefore, subjected to the same pressure as the cylinder (237). The return flow from the cylinder (237) takes place when the lever (203) is moved against the direction of the arrow through the chambers (239, 219) and (220) and the outlet pipe (221).

When a free rail end is to be welded, viz, without bending-off the three way cock (224) is changed into the position indicated by the arrow (247) to thus close valves (248) and (249) whereby the bending-off cylinder (212, 222) is completely shut off and only the two longitudinal cylinders (210, 214) and (235) are connected with the control slide-valve.

Figure 33:
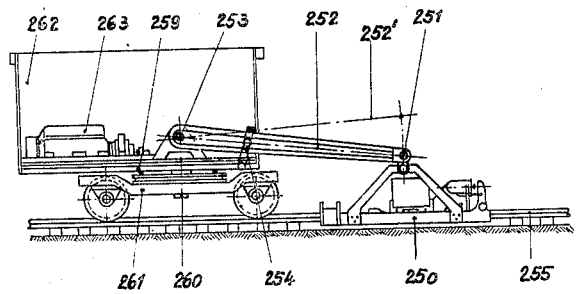
Fig. 33 is a side elevation of a work car upon which the welding apparatus is mounted.
Figure 34:
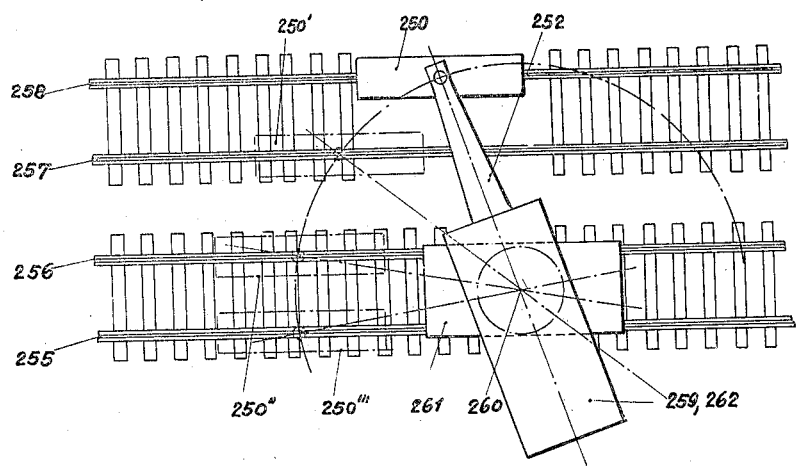
Fig. 34 is a plan thereof.
Figure 35:
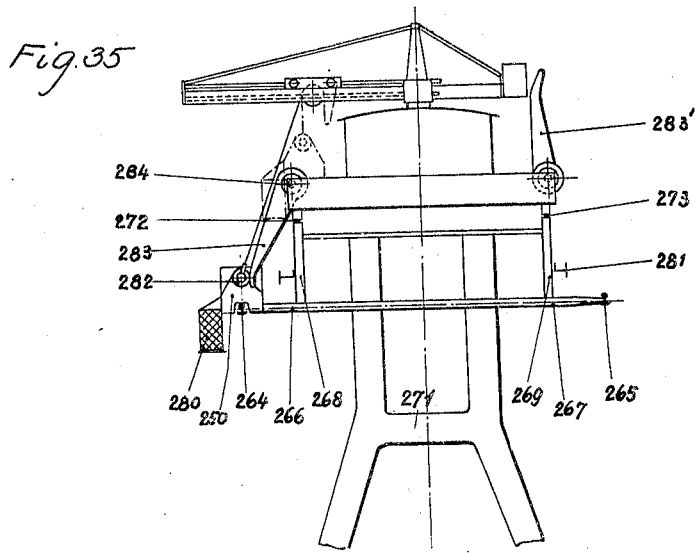
Fig. 35 shows an end elevation of a portable car carrying the welding apparatus for suspension railways.
Figure 36:
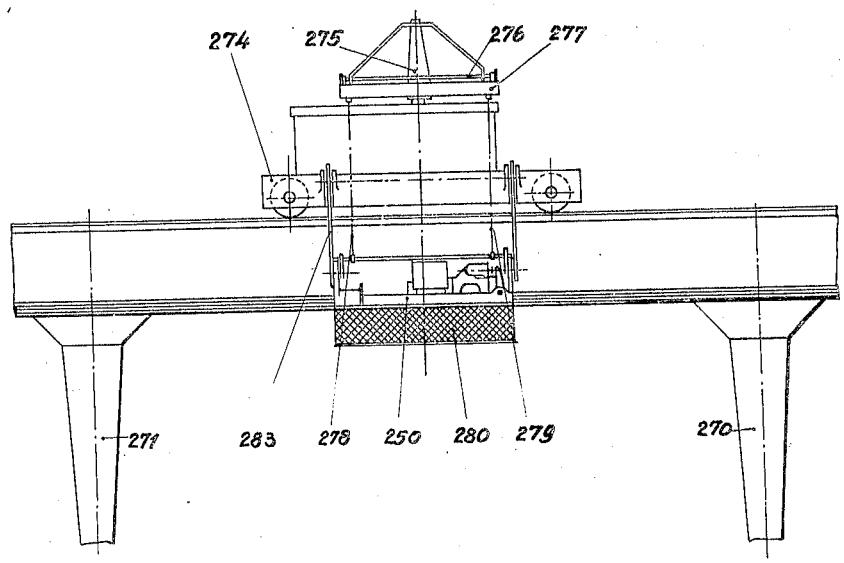
Fig. 36 is a side view thereof.

A quick, secure and accurately adjustable shifting of the welding machine frame to the rail point to be welded can be attained according to this invention by suspending that frame from the jib of a track building car, as shown in Figs. 33 and 34 for an ordinary track, and in Figs. 35 and 36 for an elevated suspension railway.

In Fig. 33 which shows a front view, and in Fig. 34 which shows a plan (250) denotes the welding machine frame supporting a welding transformer, clamping means and moving appliances for the railends. Said frame is suspended, by a joint (251), which is movable to all sides and easily oscillable, from the end of the jib (252), which can be moved up and down in known manner on an axle (253), for instance by means of a supporting spindle (254), the motion extending perhaps from the point (252) to the point (252'), the welding machine frame (250) being then lifted freely above the track (255, 256, 257, 258). The jib (252) is supported in the manner of turnable railway cranes upon a pivoted platform (259) and can be turned on an axle (260) for the purpose of conveying the load from the place (250) to the place (250') or (250'') or (250'''), as in Fig. 34. The entire arrangement just described is mounted upon the track car (261) and can, thus, be moved along the track as desired. The pivoted platform (259) is provided with a roof (262) and can carry besides the welding machinery (250), other devices and appliances, which can be attached to the jib (252). Such appliances etc. may be, for instance, a grinding device for removing the welding bar, a heating or glowing stove for refining the grain of the material of the rail at the place of welding, and the like. In order to make this working car perfectly independent of the equipment provided for the line it is suitable to provide it with a current-generating plant, for instance with a combined Diesel engine and dynamo (263), and to employ this plant as a counterweight for the jib upon the pivoted platform (259), or the plant mentioned may be carried directly by an extension of the jib (252), extending beyond the axle (253). Fig. 34 shows that a thus designed separate welding car can be used for several tracks from one and the same place, and always one of the tracks can be cleared for traffic.

In suspension railways matters are less convenient. These suspension railways in future will be used for very high speeds and must have, of course, welded rails over the whole line. In the example shown in Fig. 35 (front-view) and 36 (side-view) (264) and (265) denote the monorail tracks of the suspension railway for the two directions of traffic. These rails are fixed by means of brackets (266) and (267) to the main girders (268) and (269), which are supported by the posts (270) and (271). The upper beams of the main girders (268) and (269) carry the auxiliary rails (272) and (273) upon which track building cars (274) can run perfectly independent of the suspension railway cars. The hoisting device (275) for the welding machine frame is designed in this instance like a rotary pillar crane with travelling trolley (276) running upon the jib (277). The shiftable welding frame (250) is suspended from two ropes or chains (278) and (279), and provided with a platform (280) for the welder or welders.

In order to clear the track (264) the whole frame (250) together with the platform (280) can be lifted off the rail (264) and be put down upon the platform (274) of the track building car. Also other appliances, grinding apparatus, heating or glowing stoves etc. can be kept ready for use on the longitudinal side or on the transverse side of the platform (274) and can be seized quickly by the crane and applied to the rail (264) or (265). In order to guide the load suspended from the crane during the movements mentioned securely also if the attendant is somewhat inattentive, or if the weather is stormy, then for preventing collision with line wires (281), or similar attachments and, in order to convey the welding frame automatically and without oscillations to the rail concerned, guide members can be provided movable laterally outwards from the platform (274) to the rail (264) or (265). In the example shown in Figs. 35 and 36 these guide members are designed in the manner of an oblique hoist. The welding frame is provided on both sides with running wheels (282), running on guide jibs (283), which can be turned upwardly on an axle (284) into the position (283') and afford then a passage on the suspension rail (265).

If it would be possible to arrange the frame of the welding machine completely above the rail, the welding place would be rendered clearly visible and the operator would be enabled to use control rules and observe the welding procedure. Besides the machine would fit still better into the clear profile of ordinary railways and for suspension railways according to Figs. 35 and 36 it could be employed without the necessity of removing the rail brackets. A construction affording all these advantages is illustrated in Fig. 37. The rail-ends (285) and (286) to be welded together are engaged at the points (287) and (288) by levers (289) and (290). The spindles of these levers are located at the ends of the machine frame (291), about in the height of the point of gravity of the frame profile. One of said levers (289) is engaged by the piston-rod (292), whereas the counter pressure of the hydraulic cylinder (293) is transmitted to the other lever (290) by means of the pressure-rod (294). When the piston effects the jumping in the direction of the arrow, the levers (289) and (290) are subjected to bending strain, the fundamental frame (291) is subjected only to tensile strain, and the rod (294) as well as the rails (285, 286) are subjected also to compressive strain. Undesired or detrimental bending of the main frame and thus, also of the guided rail ends by the maximum jumping force is completely prevented as well as the actuating of the jumping force eccentrically to the rail profile. The expansion of the frame as caused by the longitudinally acting force is of no influence upon the accurateness of the welding procedure, so that the frame can be subjected to strain to the highest admissible limit and can be constructed with the smallest weight.

The configuration of the frame is shown in Figs. 38-41. The means for moving and guiding the rails to be welded are the same as already described. There are only some differences in their arrangement with respect to the main frame. The cylinder block (295) encloses the small and the large cylinder for the melting-off and the jumping movement. The transmission of the movement of the piston to the rail is effected by means of the forked lever (296) and the lugs (297). These members can be attached to the rails either by fish-plates and bolts or what is to be preferred in order to avoid boring holes in the rails by the members shown in Figs. 40 and 45. The halves (298) and (299) which hold the lugs (297) and are connected with each other in the manner of hinge-bands are pressed by links screws into the fish-plate chambers at both sides of the rail web. They transmit the longitudinally acting forces by friction. The unmoved railend is not stationary, as formerly described, but it is also guided by rollers and fixed by the lugs (303) on the lever (301) which is connected with the cylinder block by the pressure rods (301). As the clamping jaws holding these lugs can be attached to the rail before attaching the welding machine, and can be detached after the welding machine has been removed, this arrangement presents the advantages of a favourable distribution of the forces and of simple and quick mounting of the welding machine, which is particularly useful in the case of a plurality of weldings lying practically side by side, as in mounting new tracks.

The guide rollers (304) in this case are arranged below the main frame and outside the same, whereby the rail remains freely accessible and can be examined as to exact position, etc., and the welding can be conveniently observed.

In suspended railways, where the rails are fastened to transverse brackets, as shown in Fig. 43, the distance between the rollers is so chosen, that said brackets are located between the rollers, whereby the welding can be effected without removing the said brackets before welding.

In the case of repair weldings it occurs, that a new rail must be welded together with a worn one. The rails must then be welded together in such a manner that the treads lie in one plane. Differences of height at the rail feet are equalized by placing a plate or plates underneath the foot of the worn rail. The fish-plate chambers of the two rails are then displaced with respect to each other, as shown in Fig. 44, and in correspondence therewith the rollers must be adjustable in height. An example is shown in Figs. 41 and 42. The eccentric bolt (305) which carries the guide roller is fixed, as regards its height, by the box (307), which is screwed into the main frame (306). The box is provided with worm-teeth and can be screwed up and down by means of the hand-wheel (309) and of the worm gear (308). For the purpose of adjusting said members equally the worm shafts (310) of two oppositely located guide rollers can be coupled with one another.

What I claim is:

1. In apparatus for jointlessly welding the rails of a railway track by electrical melting off, the combination with an auxiliary motor connected to a detached portion of said rails for longitudinally reciprocating the same, of a manually actuated controller, means connecting said controller to said motor for controlling said motor in accordance with the manual actuation of said controller, and means, connecting said rails and said controller, and comprising a member connected to said rail and active upon a continued movement of said rail to actuate said controller to thereby limit the movement of said rail by said motor.

2. In an apparatus for jointlessly welding the rails of a railway track, a hydraulic motor for longitudinally moving a detached rail section, a second hydraulic motor for bending said section, means for supplying fluid to said motors for operating the same, characterized by the fact that automatic means governs the flow of fluid such that bending movements of the rail occur prior to the longitudinal movements thereof.

3. In an apparatus for jointlessly welding the rails of a railway track, a hydraulic motor for longitudinally moving a detached rail section, a second hydraulic motor for bending and straightening said detached section, means for supplying fluid to operate said motors characterized thereby that reducing valves govern the flow of fluid to said motors such that for longitudinal movements of the rail the motor for such longitudinal movement receives fluid prior to the flow of fluid to the bending motor, whereas for bending movement the motor for such bending movement receives fluid prior to the flow of fluid to the longitudinal-movement motor.

4. In an apparatus for jointlessly welding the rails of a railway track, a hydraulic motor for longitudinally moving a detached rail section, a second hydraulic motor for bending and straightening said section, means for supplying fluid under pressure to operate said motors, including reducing valves, characterized thereby that for bending said rail section the motor for bending receives fluid while the motor for longitudinal movement does not receive any fluid, and for straightening said rail section the motor for longitudinal movement of the rail section receives fluid while the motor for bending does not receive fluid.

5. In an apparatus for jointlessly welding the rails of a railway track, a hydraulic motor for longitudinally moving a detached rail section, a second hydraulic motor for bending and straightening said section, means for supplying fluid under pressure to operate said motors, including reducing valves, characterized thereby that said motors include cylinders and pistons, and said motors function as hydraulic brakes for return movements of said rail section by a closing of the cylinders thereof by a throttle valve.

6. In an apparatus for jointlessly welding the rails of a railway track, a hydraulic motor for longitudinally moving a detached rail section, a second hydraulic motor for bending and straightening said detached section, and a third smaller hydraulic motor for longitudinally moving the rail section for rapid melting-off movements.

7. In an apparatus for jointlessly welding the rails of a railway track, a hydraulic motor for bending and straightening a detached rail section, two hydraulic motors for longitudinally moving said detached section, one of said motors being smaller than the other and functioning to give rapid melting-off movements, characterized thereby that the larger motor remains at rest during melting-off movements of the smaller motor and then delivers hammer-like blows for jumping longitudinal movements.

8. The structure as in claim 7 wherein a single controller controls the two motors for longitudinal movement by a detachable connection.

9. The structure as in claim 7, wherein a single controller controls the two motors for longitudinal movement, said controller having a back pressure thereon when actuating the larger motor to indicate to the operator thereof the extent of longitudinal movement.

10. In an apparatus for electrically welding the rails of a railway track, a motor for longitudinally moving the end of a detached rail section, mechanical clamping means securing said motor to said rail section, and separate electrical connections to the ends of the rails to be electrically welded.

11. The structure as in claim 10, wherein the conducting cheeks for the electrical connections lie in the fish plate chambers of the rails.

12. In an apparatus for jointlessly welding the rails of a railway track, a motor for longitudinally moving a detached rail section, a welding machine clamped to said section, and a measuring device secured to the rails to be welded by clamping means which is separate from and independent of the mechanical fastening for the welding machine.

13. In an apparatus for jointlessly welding the rails of a railway track, a motor for longitudinally moving a detached rail section, clamping means for securing said motor to said rail section, a welding machine including an electrical transformer, clamping means for electrically connecting said transformer to the rails to be welded, and a rigid frame having mounted thereon the said motor, clamping means and transformer, said frame being arranged for mounting on said rails.

14. The structure as in claim 13, wherein the welding machine has profiled rollers thereon to guide the rails in both horizontal and vertical direction.

15. The structure as in claim 13, wherein the welding machine has profiled guide rollers thereon to guide the rail in horizontal and vertical directions, there being three pairs of rollers cooperating with the rail end to be moved to guide the same in a straight line.

16. The structure as in claim 13, wherein the welding machine has profiled guide rollers thereon to guide the rail in horizontal and vertical direction, and hand-operated means are provided for clamping said rollers in place on the rails.

17. The structure as in claim 13, wherein the welding machine has profiled guide rollers thereon to guide the rail in horizontal and vertical direction, said rollers being manually adjusted in pairs lying opposite one another.

18. The structure as in claim 13, wherein the welding machine has guide rollers thereon for the rail, and means for clamping said frame to the rails whereby said frame acts as a drawing or pressure member for the longitudinal jumping forces.

19. The structure as in claim 13, wherein the welding machine has guide rollers thereon for the rail, the supporting frame for the welding machine lying above the rails, the guiding rollers projecting downwardly below said frame.

20. In an apparatus for jointlessly welding the rails of a railway track, a motor for longitudinally moving a detached rail section for jumping pressures, means for clamping said motor to said detached rail section, and means for transmitting the forces of said motor to the center of said detached rail section including a forked lever clamped against both sides of said rail.

21. The structure as in claim 20, wherein said forked lever cooperates with separate lugs, said lugs being secured to said rail like a fish plate.

22. In an apparatus for jointlessely welding the rails of a railway track, a construction car, a welding machine mounted on jib, said jib being secured to said car adjacent one end thereof, and an electric generating plant mounted near the other end of said car to act as a counter-weight to said jib.

23. The structure as in claim 22, wherein said construction car is adapted to run on auxiliary tracks, and has secured thereto guiding members movable sideways from the car to thereby guide the welding machine on the rails to be welded.

24. The structure as in claim 22, wherein said car is adapted to run on auxiliary tracks, guiding rails are extensibly secured to said car, and the welding machine has rollers adapted to be received on said extensible rails, whereby said welding machine may be moved outwardly from said car over the rails to be welded.

In testimony whereof I have affixed my signature.

CURT STEDEFELD.